(12) United States Patent
Janser

(10) Patent No.: US 11,497,308 B2
(45) Date of Patent: Nov. 15, 2022

(54) ASSEMBLY MADE OF A BEARING WEB FOR A DRAWER BASE AND A HOLDING DEVICE

(71) Applicant: Julius Blum GmbH, Hoechst (AT)

(72) Inventor: Pascal Janser, Hoechst (AT)

(73) Assignee: Julius Blum GmbH, Hoechst (AT)

( * ) Notice: Subject to any disclaimer, the term of this patent is extended or adjusted under 35 U.S.C. 154(b) by 212 days.

(21) Appl. No.: 16/916,442

(22) Filed: Jun. 30, 2020

(65) Prior Publication Data
US 2020/0329864 A1 Oct. 22, 2020

Related U.S. Application Data

(63) Continuation of application No. PCT/AT2018/060302, filed on Dec. 14, 2018.

(30) Foreign Application Priority Data

Jan. 2, 2018 (AT) .............................. A 50001/2018

(51) Int. Cl.
*A47B 88/41* (2017.01)
*A47B 88/90* (2017.01)
(Continued)

(52) U.S. Cl.
CPC ............ *A47B 88/41* (2017.01); *A47B 88/941* (2017.01); *F16C 29/02* (2013.01); *A47B 88/402* (2017.01);
(Continued)

(58) Field of Classification Search
CPC ..... A47B 88/41; A47B 88/941; A47B 88/402; A47B 88/427; F16C 29/02; F16C 2314/72
(Continued)

(56) References Cited

U.S. PATENT DOCUMENTS

| 7,708,358 B2 * | 5/2010 | Embacher ............ A47B 88/463 312/333 |
| 8,109,582 B2 | 2/2012 | Dubach |

(Continued)

FOREIGN PATENT DOCUMENTS

| CN | 102065727 | 5/2011 |
| CN | 102781278 | 11/2012 |

(Continued)

OTHER PUBLICATIONS

International Search Report dated Jan. 28, 2019 in International (PCT) Application No. PCT/AT2018/060302.

*Primary Examiner* — James O Hansen
(74) *Attorney, Agent, or Firm* — Wenderoth, Lind & Ponack, LLP

(57) ABSTRACT

An assembly includes a bearing web for a drawer base of a drawer, and a holding device for a drive device for driving the drawer relative to a furniture body. The holding device has a securing element, by which the holding device can be secured to the bearing web. The bearing web includes a receiving area for the securing element and a bearing region for the drawer base adjacently to the receiving area. The securing element has a support surface that faces the drawer base in a secured state, and the holding device is secured to the bearing web. The support surface of the securing element and the bearing region of the bearing web form a substantially flat drawer base bearing surface for the drawer base in the secured state. The drawer base bearing surface can rest against the drawer base in a flush manner in the secured state.

20 Claims, 9 Drawing Sheets

(51) Int. Cl.
*F16C 29/02* (2006.01)
*A47B 88/427* (2017.01)
*A47B 88/40* (2017.01)

(52) U.S. Cl.
CPC ......... *A47B 88/427* (2017.01); *F16C 2314/72* (2013.01)

(58) Field of Classification Search
USPC .......................................................... 312/333
See application file for complete search history.

(56) References Cited

U.S. PATENT DOCUMENTS

| | | |
|---|---|---|
| 8,590,991 B2 | 11/2013 | Radusin |
| 8,833,879 B2 | 9/2014 | Netzer |
| 9,693,629 B2 | 7/2017 | Susnjara |
| 9,872,563 B2 | 1/2018 | Davis |
| 10,143,303 B2 | 12/2018 | Koenig et al. |
| 2008/0191592 A1 | 8/2008 | Dubach |
| 2010/0314981 A1* | 12/2010 | Koenig ................... E05C 19/02 312/333 |
| 2011/0200278 A1 | 8/2011 | Radusin |
| 2013/0249368 A1 | 9/2013 | Netzer |
| 2015/0327677 A1 | 11/2015 | Susnjara |
| 2017/0095084 A1 | 4/2017 | Koenig et al. |
| 2017/0273456 A1 | 9/2017 | Davis |
| 2018/0140096 A1 | 5/2018 | Davis |

FOREIGN PATENT DOCUMENTS

| | | |
|---|---|---|
| CN | 103228179 | 7/2013 |
| CN | 103492654 | 1/2014 |
| DE | 10 2010 016 133 | 9/2011 |
| JP | 2009-506847 | 2/2009 |
| JP | 2013-543766 | 12/2013 |
| KR | 10-2013-0065591 | 6/2013 |
| WO | 2012/068605 | 5/2012 |
| WO | 2012/156229 | 11/2012 |
| WO | 2015/192153 | 12/2015 |

* cited by examiner

Fig. 2
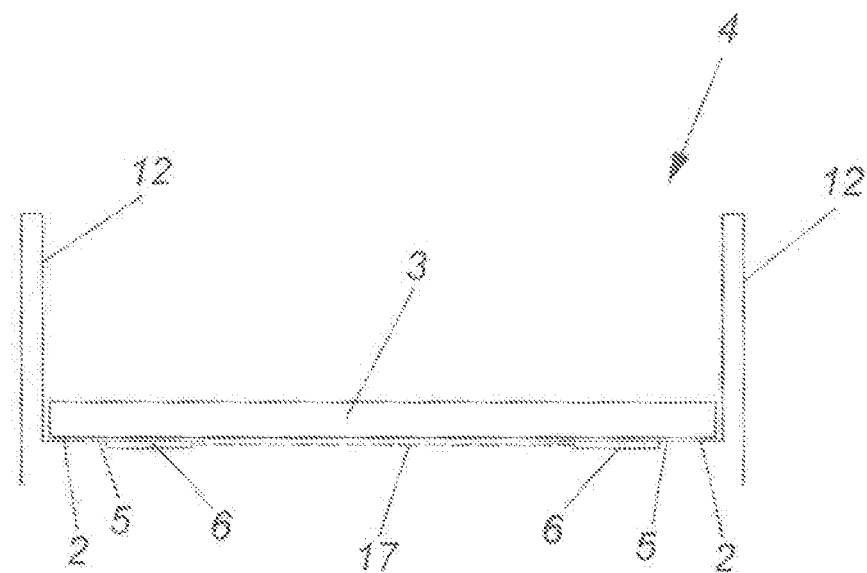
Fig. 3 (St. d. T.)
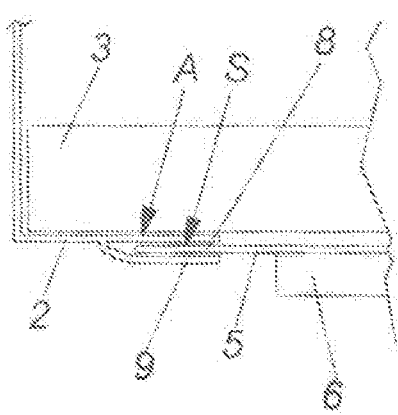
BZ
Fig. 4
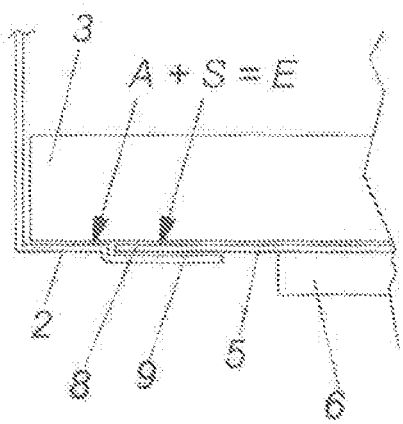
BZ

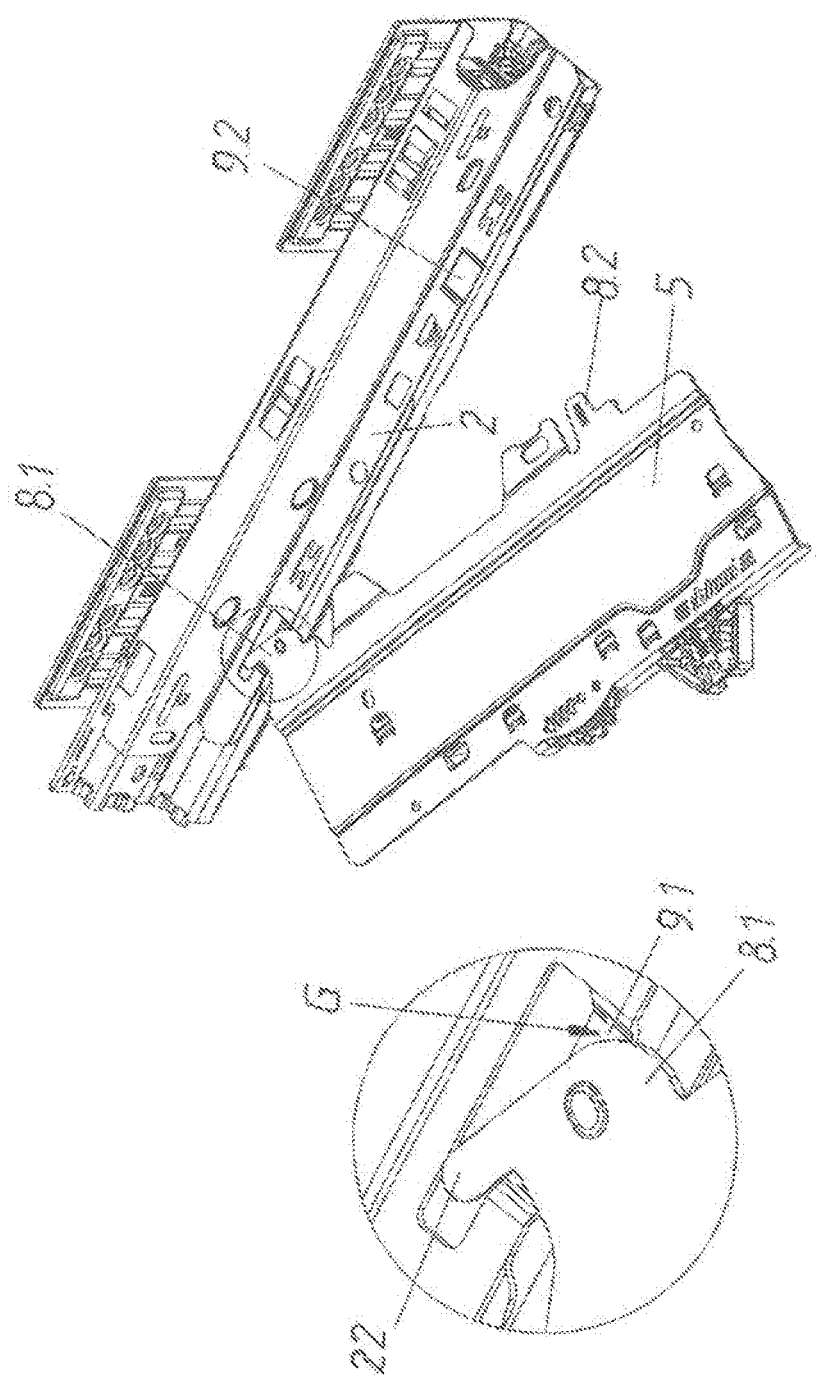

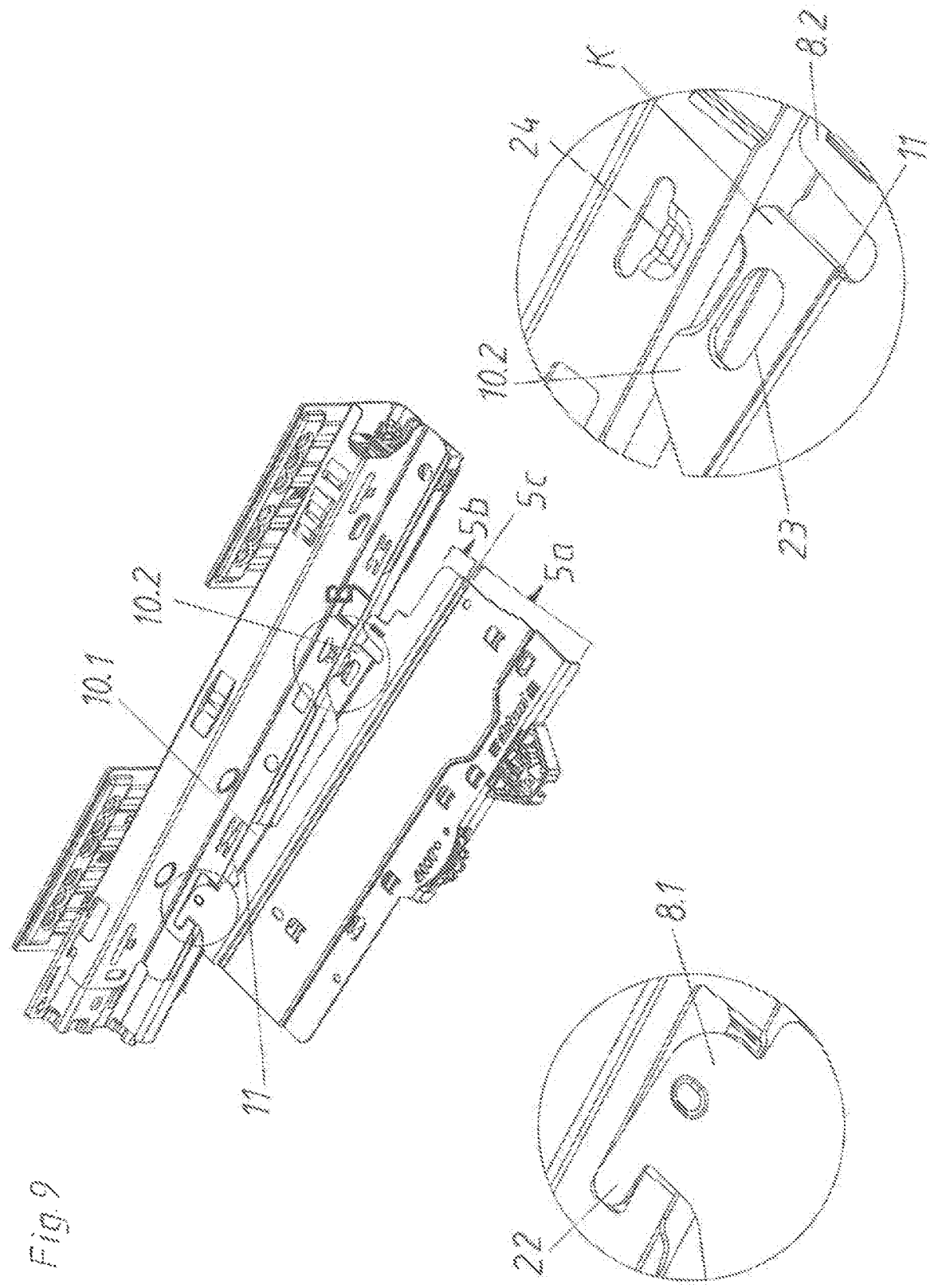

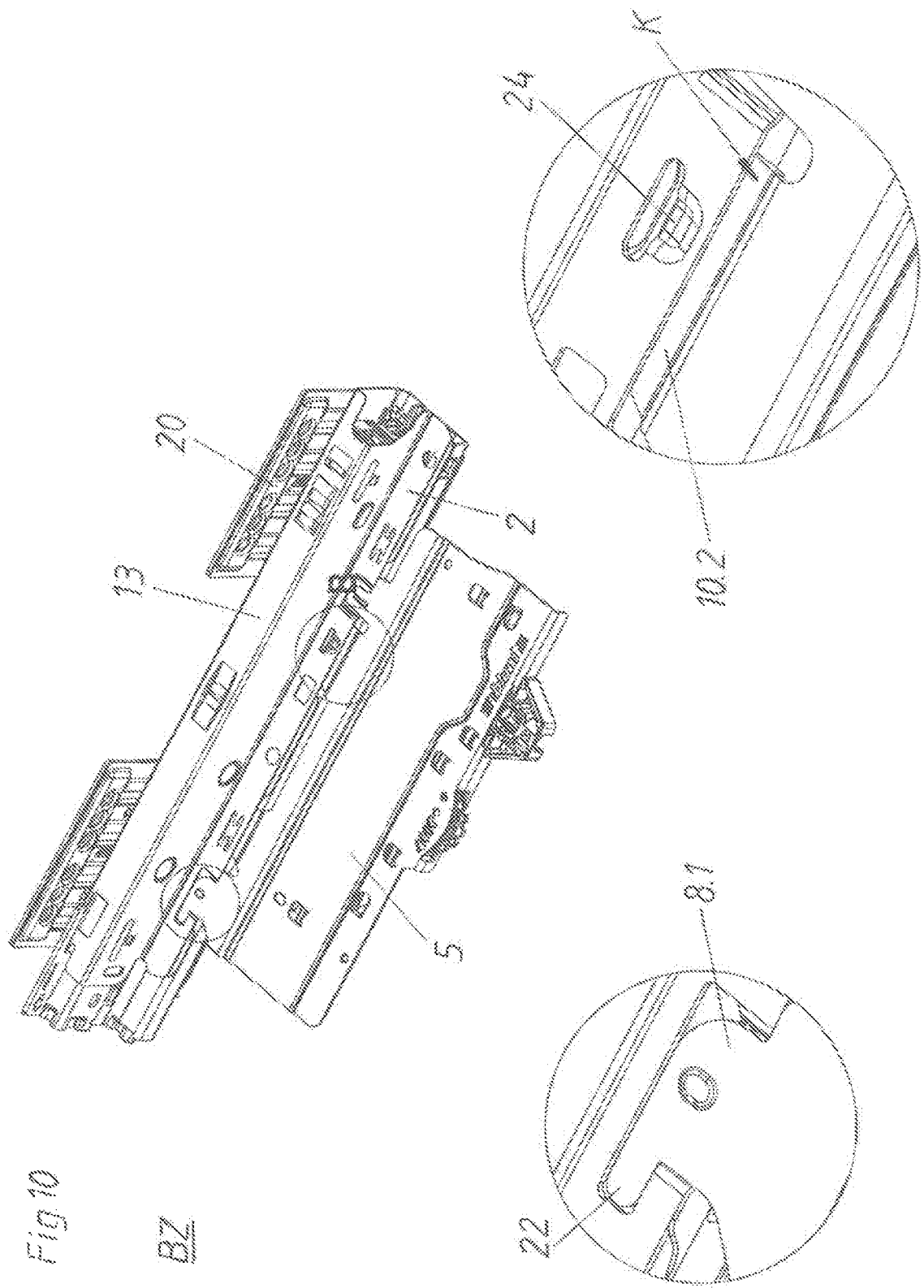

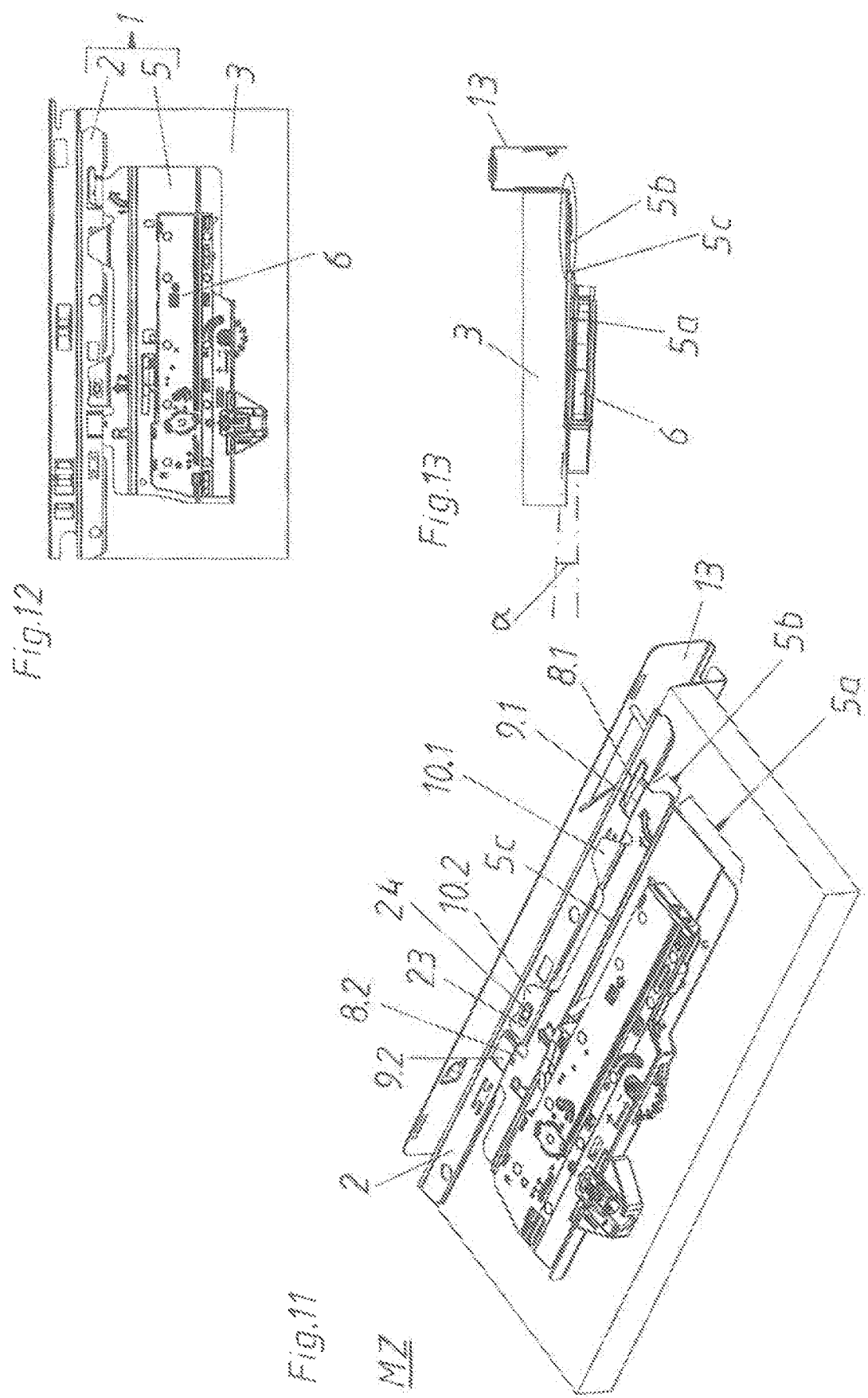

ASSEMBLY MADE OF A BEARING WEB FOR A DRAWER BASE AND A HOLDING DEVICE

BACKGROUND OF THE INVENTION

The invention concerns an arrangement comprising at least one bearing web for a drawer base of a drawer and at least one holding device for a drive device, in particular an ejection device, for driving the drawer relative to a furniture carcass. The at least one holding device has at least one securing element, by which the at least one holding device can be secured to the bearing web. The bearing web comprises at least one receiving area for the at least one securing element and at least one bearing region for the drawer base adjacently to the at least one receiving area, and the at least one securing element comprises a support surface that faces the drawer base in a secured state, in which the at least one holding device is secured to the bearing web.

For many years, drive devices—especially ejection devices and retraction devices—have been used in the industrial sector of furniture fittings in order to move movable furniture parts (e.g. drawers, furniture doors or furniture flaps) relative to a furniture carcass, Important aims when constructing such drive devices are—besides a flawless as possible functionality—a simple as possible mounting and little space requirement.

Especially in the case of drawers there is very little space in the region of the extension guides for arranging such drive devices. For drawers, therefore, the mounting of the drive devices—especially of the ejection devices—on the bottom of the drawer base has emerged as a space-saving solution. An example for such a construction is disclosed in the WO 2015/192153 A1. In this case, the mounting plate (holding device) of the ejection device is secured directly to the drawer base.

For some time past, the applicant also offers drive devices where the holding device of the drive device is not directly secured to the drawer base, but rather the holding device is secured on a bearing web of a drawer side wall. Such a non-generic prior art is described in more detail further below with reference to FIG. 5. In the case of this known securing variant, two lug-shaped receiving areas are formed on the bearing web. The holding device of the drive device is inserted into these receiving areas by means of securing elements (in the form of protrusions). The securing elements, here, on both sides contact the surface of the receiving area and are clamped in the receiving area.

FIG. 5 shows a holding device 5 together with a drive device 6 and a bearing web 2 according to the prior art. In the lower image, a view of the drawer base 3 from below is illustrated. Two lug-shaped receiving areas 9 are formed on the bearing web 2. The tongue-shaped securing elements 8 of the holding device 5 are inserted into these lug-shaped receiving areas 9. The lug-shaped bent region of the receiving areas 9 is visible particularly well in the section A-A. This section runs parallel to a lateral surface of a drawer side wall. The drawer base 3 rests against the bearing region A of the bearing web 2. In the zoomed details illustrated top left and top right, it is apparent that the securing elements 8 are intruding into the recess of the receiving area 9, wherein the support surface S— measured rectangular to the longitudinal extension L of the metal sheet of the bearing web 2—is distanced from the bearing region A. It is apparent that the recess for the receiving area 9 has to be quite large.

The object of the present invention is to provide an alternative or improved securing possibility for an arrangement. In particular, the space requirement shall be as little as possible.

SUMMARY OF THE INVENTION

Accordingly, the support surface of the at least one securing element together with the at least one bearing region of the bearing web form a substantially flat drawer base bearing surface for the drawer base in the secured state, wherein the drawer base bearing surface can be brought to rest against the drawer base in a flush manner in the secured state. In a mounting state, thus, the at least one securing element is clamped between the receiving area and the drawer base, and is not only clamped in the receiving area alone. As a consequence, the securing region (receiving area and securing element) is formed smaller by a third. Hence, the whole arrangement is more compact.

In principle, the region of the securing element remote from the support surface can be formed arbitrarily, as long as a sufficient holding on the receiving area is possible. Preferably, the at least one securing element has a holding surface which is remote from the support surface. In the secured state, the holding surface of the securing element rests on a counter holding surface of the receiving area of the bearing web. For a simple production, preferably the at least one securing element is formed planar, preferably tongue-shaped. In particular, the holding surface is oriented parallel to the support surface. For the counter holding surface formed on the holding device, preferably this counter holding surface is oriented parallel to the bearing region.

The bearing web should be formed in such a way that the drawer base can be connected to the bearing web in a simple manner. Preferably, the bearing web is formed as a planar component. For a simple production it is preferably provided that the bearing web is formed as a metal sheet with a substantially constant sheet thickness. A metal sheet is a flat milled product made of metal. "Substantially constant" means that the sheet thickness can have slight differences. Thus, the sheet thickness can be thicker in the edge region of punchings or can be thinner in bent regions. Mostly, metal sheets which have a sheet thickness between 0.3 mm and 4 mm, preferably between 0.6 mm and 1.5 mm, are used for bearing webs.

It is possible that the at least one receiving area is formed as a separate component and is connected (detachably or in a fixed manner) to the bearing web. Preferably, however, the receiving area is formed in one piece with the bearing web.

The receiving area in the bearing web has just to be formed so that the at least one securing element of the holding element can be secured to the receiving area. For a simple construction, preferably the receiving area comprises a recess in the metal sheet which leads away from the bearing region. Preferably, the at least one receiving area is bent out form the metal sheet of the bearing web as a U-shaped lug. For a simple securing of the securing element, the counter holding surface of the receiving area is distanced by one sheet thickness from the bearing region measured rectangular to the longitudinal extension of the metal sheet. The counter holding surface, thus, is formed by the "lowest" region of the U-shaped lug.

For a particularly compact construction, preferably in the secured state, the securing element and the receiving area together have a thickness—measured rectangular to the longitudinal extension of the metal sheet—which is twice as thick as the sheet thickness of the bearing web. In contrary, in the prior art the thickness in the securing region is at least three times as thick as the metal sheet thickness.

The holding device should be formed so that the drive device can be secured easily and that the material expenses are as little as possible and still a stable construction is reached. Preferably, the holding device is formed as a metal sheet with a substantially constant sheet thickness. "Substantially constant" means that the sheet thickness, of course, can have slight differences. Thus, the sheet thickness can be thicker in the edge region of punchings or can be thinner in bent regions. Mostly, metal sheets which have a sheet thickness between 0.3 mm and 4 mm, preferably between 0.6 mm and 1.5 mm, are used for the holding device. Particularly preferred, the holding device has the same sheet thickness as the bearing web.

It is possible that the at least one securing element is formed as a separate component and is connected (detachably or in a fixed manner) to the holding device. Preferably, however, the securing element is formed in one piece with the holding device.

In general, it is possible that the holding device is mounted, preferably screwed, to the drawer base by means of separate connecting elements. For a simple mounting, however, preferably the holding device is secured to the bearing web only by the at least one securing element.

Preferably, the holding device comprises two, preferably tongue-shaped, securing elements.

According to a preferred exemplary embodiment, the holding device comprises a substantially flat drive device mounting region, a substantially flat drawer base resting region, and the at least one securing element. For a secure mounting of the holding device together with the drive device, preferably a bend is formed between the drive device mounting region and the drawer base resting region, in which the drive device mounting region is bent relative to the drawer base resting region in an angle region between 1° and 15°, preferably between 3° and 5°). As a consequence, the drive device mounting region is pressed to the drawer base. This leads to a stable hold and to a compact construction. The drive device, thus, is protruding from the drawer base as little as possible.

Per se, it is sufficient if only the at least one securing element serves for the securing of the holding device on the bearing web. In order to reach a still more secure hold, however, preferably at least one, preferably tongue-shaped, clamping element is arranged on the holding device, which clamping element in the secured state abuts with its clamping surface which is facing towards the drawer base—preferably the clamping surface being oriented parallel to the support surface of the securing element—a counter clamping surface of the bearing web which counter clamping surface is remote from the bearing region of the bearing web—preferably the counter clamping surface being oriented parallel to the bearing region of the bearing web. As a consequence, the bearing web is clamped between the clamping element and the drawer base. The at least one clamping element and the at least one securing element, thus, are attached to the bearing web in a tongs-like manner. Especially, with this clamping element it is possible that the holding device can also be attached securely to the bearing web without the drawer base.

The clamping element per se can be formed as a component which is separate from the holding device. Preferably, however, the damping element is formed in one piece with the holding device. Particularly preferred, the at least one clamping element is connected to the drawer base resting region by means of a bent region.

In order to enable a compact construction—if there is a clamping element—preferably the damping surface of the at least one damping element—measured rectangular to the longitudinal extension of the metal sheet of the holding device—is distanced by (exactly) one sheet thickness from the support surface of the securing element.

For a construction with as few components as possible, according to a first variant, the bearing web is part of a, preferably profile-shaped, drawer side wall (often also defined as drawer frame). As an alternative—according to a second variant—the bearing web is part of a, preferably profile-shaped, carrier device for a drawer side wall. In this case, thus, the carrier device forms the lateral and lower corner region of the drawer. On this carrier device, the respective drawer side wall with the desired height, the desired design and the desired material can be mounted. Particularly preferred, the bearing web is a part of a container rail. This container rail can be connected in a perfectly fitting manner with the drawer rail of an extension guide. According to a third variant, however, the bearing web is part of a drawer rail of an extension guide. If the whole drawer is detached from the furniture carcass, in the case of the first two variants the (detachable and re-establishable) separation is effected between the drawer frame or the carrier device and the drawer rail of the extension guide. This means, the drawer rail (by way of the carcass rail) remains on the furniture carcass when the drawer is detached. In the case of the third variant, in contrary, the separation is established between the drawer rail and the carcass rail. This means, the drawer rail remains on the drawer when the drawer is detached. The bearing web, then, is formed directly on this drawer rail. Preferably, it is provided for all three variants that the drawer side wall, the carrier device or the drawer rail comprises a region which in a sectional view is substantially U-shaped, wherein the bearing web (preferably in the region of the opening of the U) is protruding laterally, preferably horizontally, from this substantially U-shaped region directing towards the drawer base. In the mounting state the U of this U-shaped region is arranged upside down.

The arrangement described hereinbefore only comprises the components holding device and bearing web. This arrangement can be delivered and can be assembled by a user. Only on the assembling location the corresponding drive device can be mounted to a holding device of such an arrangement. However, in order to minimize the assembly efforts, the arrangement also comprises a drive device for driving the drawer relative to the furniture carcass, wherein the drive device is mounted to the holding device, preferably in the drive device mounting region of the holding device.

The drive device can be formed as ejection device and/or as retracting device.

In the case of an ejection device, preferably this ejection device comprises an ejection force storage member, a movable ejection element which is force-actuated by the ejection force storage member and a locking device for locking the ejection element in a locking position, wherein the ejection element can be unlocked by over-pressing the drawer into an over-pressing position situated beyond a closed position of the drawer and—when the ejection element is unlocked—the drawer is movable into opening direction by means of the ejections force storage member and the ejection element. Additionally, an entrainment member which corresponds with the ejection element can be provided on the furniture carcass or on the carcass rail. The ejection device can be pushed off from this entrainment member.

The scope of delivery of the producers of furniture fittings mostly just comprises the furniture fittings. This means, the other furniture components, mostly made of wood, are not included in the scope of delivery. A technician, thus, in a normal case during mounting will connect the previously described arrangement comprising the holding device and the bearing web with the remaining components of the drawer accordingly and will mount all parts in the furniture carcass. Although the arrangement has been defined with regard to the drawer base, the drawer base itself is not part of the arrangement.

According to an exemplary embodiment, the arrangement comprises a drawer base which in a mounting state abuts the bearing region of the bearing web and the support surface of the at least one securing element in a flush manner. Especially, by way of this mounting of the drawer base a sufficient fixing, in particular a force-fitting hold, of the holding device between the bearing web and the drawer base is reached in the mounting state.

The drawer base per se can be formed arbitrarily. Preferably, the drawer base is formed as a flat wooden plank with a substantially constant plank thickness. Preferably, the bottom side of the drawer base is formed substantially flat. However, it is possible that a groove is formed in each lateral region by way of which a good connection can be reached with corresponding elements in the region of the bearing web.

Protection is also sought for an item of furniture comprising a furniture carcass and a drawer, wherein the drawer comprises an arrangement according to the invention. Preferably, the item of furniture also comprises an extension guide by way of which the drawer is movably supported on the furniture carcass.

BRIEF DESCRIPTION OF THE DRAWINGS

Further details and advantages of the present invention are described more fully hereinafter by means of the specific description with reference to the embodiments by way of example illustrated in the drawings in which:

FIG. 2 shows a schematic section through a drawer,

FIG. 3 shows a schematic section through a securing region according to the prior art, FIG. 4 shows a schematic section through a securing region according to the present invention, FIG. 8-10 are perspective views showing the securing movement of the holding device on the bearing web, FIG. 11 is a perspective view showing a holding device for the drive device secured in the region of the bottom side of the drawer base, FIG. 12 is a view from below corresponding to FIG. 11, and FIG. 13 is a front view of an arrangement comprising a holding device, a bearing web, a drawer base and a drive device.

DETAILED DESCRIPTION OF THE INVENTION

Figure 1:
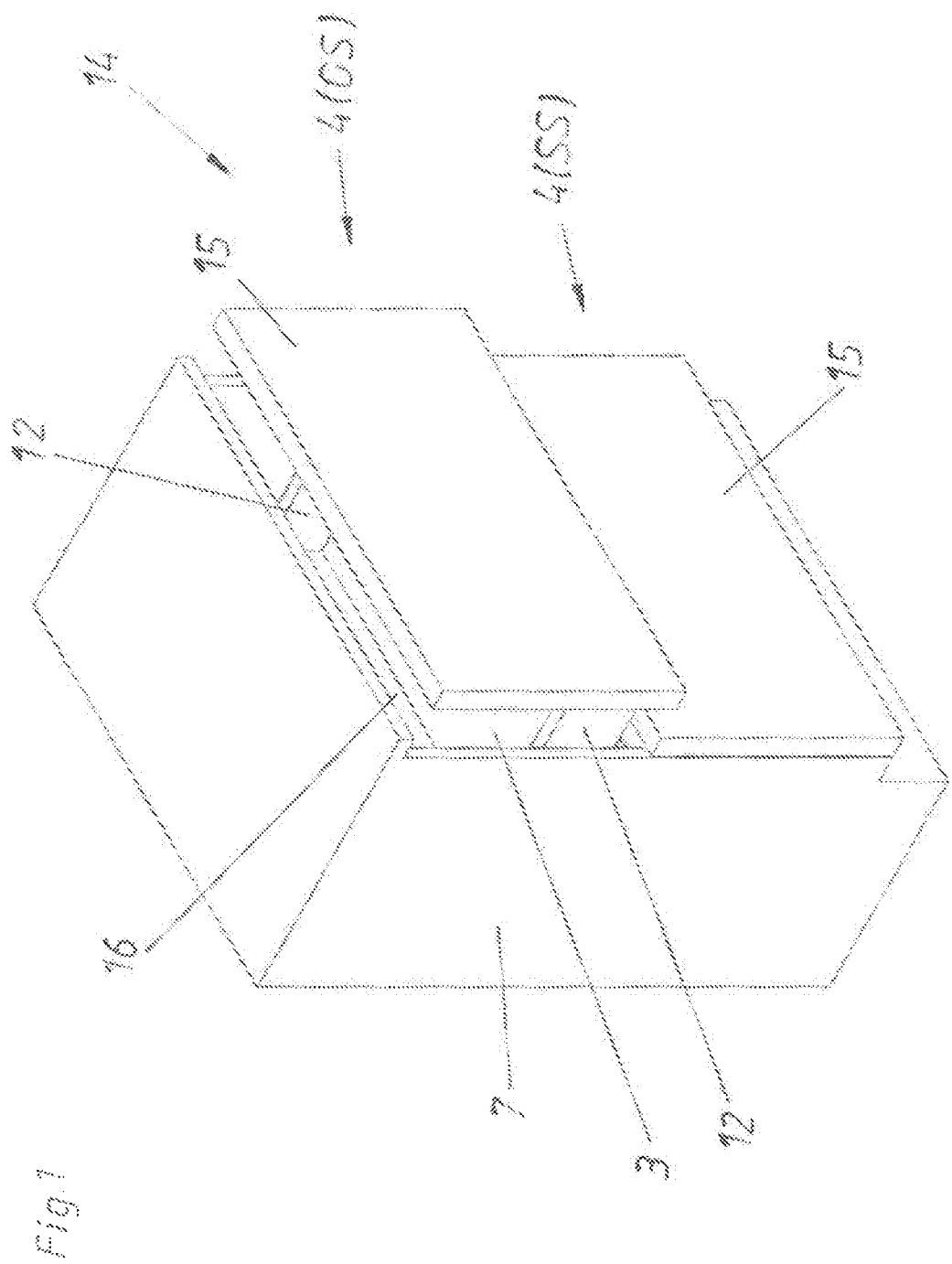
FIG. 1 is a perspective view of the item of furniture.

In FIG. 1 a perspective view of an item of furniture 14—in this case with two drawers 4—is shown. The two drawers 4 are linearly movable supported on a furniture carcass 7 by way of an extension guide (not illustrated here). The upper drawer 4 is situated in an open position OS, whereas the lower drawer 4 is situated in a closed position SS. Each drawer 4 comprises a front panel 15, a drawer back wall 16, two drawer side walls 12 (with a bearing web 2 each) and drawer base 3.

FIG. 2 schematically shows a section through the drawer 4. This section runs parallel to the front side of the front panel 15. In this section the drawer base 3 is illustrated as a flat plank. In this case, the bearing webs 2 are formed in one piece with the profile-shaped drawer side wall 12. Drive devices 6 (preferably ejection devices) are arranged on the bottom side of the drawer base 3 on both lateral sides. Movements of these drive devices 6 can be synchronized by the synchronizing rod 17 (illustrated with a dashed line). In previously known variants, these drive devices 6 are each attached by (plate-shaped) holding devices 5 on the bottom side of the drawer base 3 or in the region of the bearing web 2.

A securing variant according to the prior art is illustrated schematically in FIG. 3. In this variant the drawer base 3 is resting on the bearing region A of the bearing web 2 in a flush manner. A lug-shaped receiving area 9 is formed in the region of the bearing web 2. The holding device 5 (together with the drive device 6) is secured in the receiving area 9 by way of the securing element 8 in a clamped manner. The support surface S of the securing element 8 facing towards the drawer base 3 rests in a clamped manner on a surface of the bearing web 2 which is remote from the drawer base 3. In this illustration it is visible that the securing region is relatively thick.

In contrary, in FIG. 4 the securing variant according to the present invention is illustrated schematically. Also here, the drawer base 3 is resting on the bearing region A of the bearing web 2. The bearing web 2 comprises a receiving area 9 for the securing element 8 of the holding element 5, the receiving area 9 being arranged adjacently to the bearing region A. In the illustrated secured state BZ the securing element 8 is held in a clamped manner between the drawer base 3 and the receiving area 9. The support surface S of the securing element 8, here, directly contacts the drawer base 3. The support surface S of the at least one securing element 8 together with the at least one bearing region A of the bearing web 2 form a substantially flat drawer base bearing surface E for the drawer base 3. Put in other words, in the secured state BZ the support surface S and the bearing region A are arranged in the same horizontal plane. The drawer base 3 rests against the drawer base bearing surface E in a flush manner. As can be seen well in a comparison of the FIGS. 3 and 4, the securing region in FIG. 4 is formed thinner by a third approximately.

Figure 5:
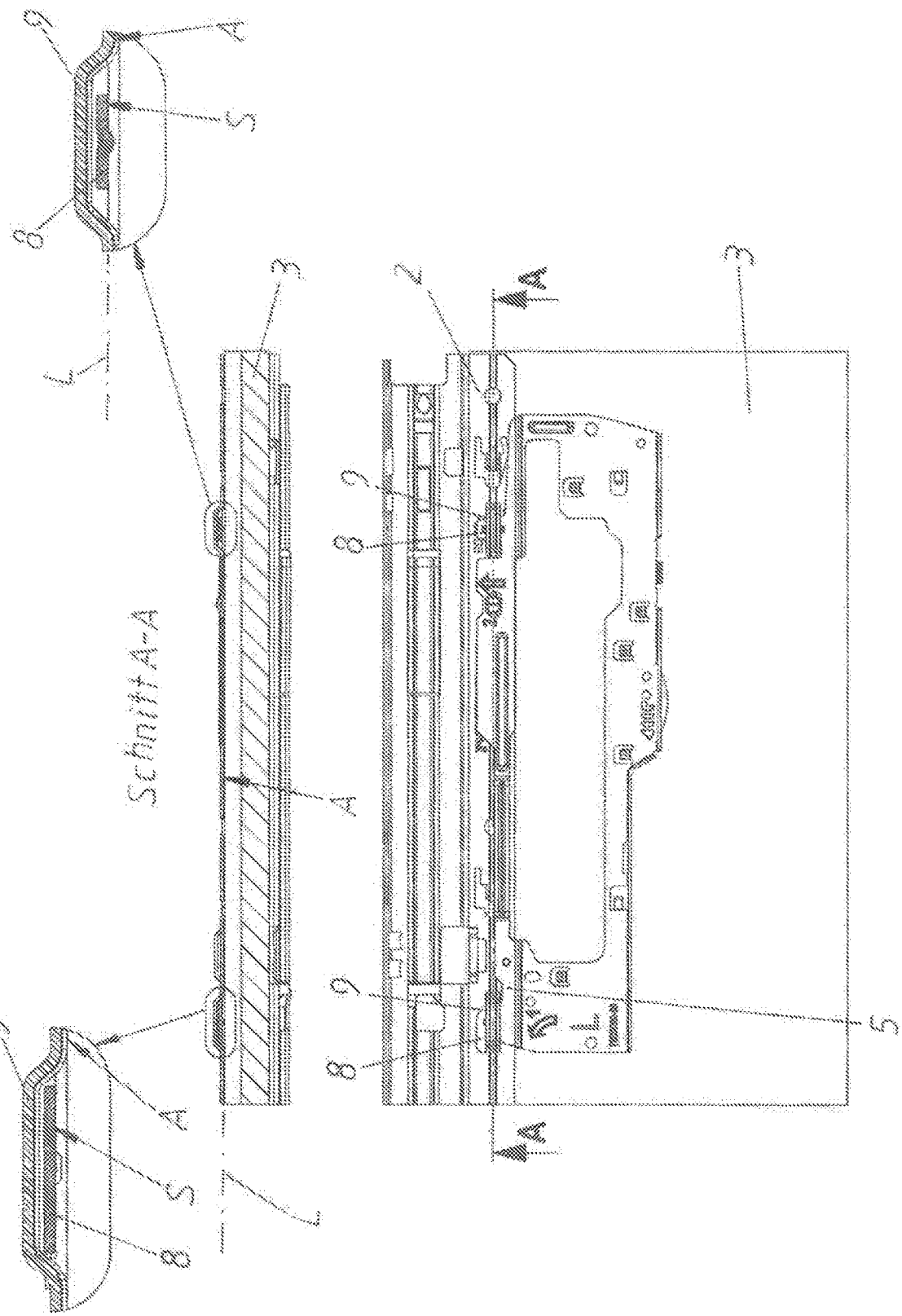
FIG. 5 is a view from below and a section through a drawer according to the prior art.
Figure 6:
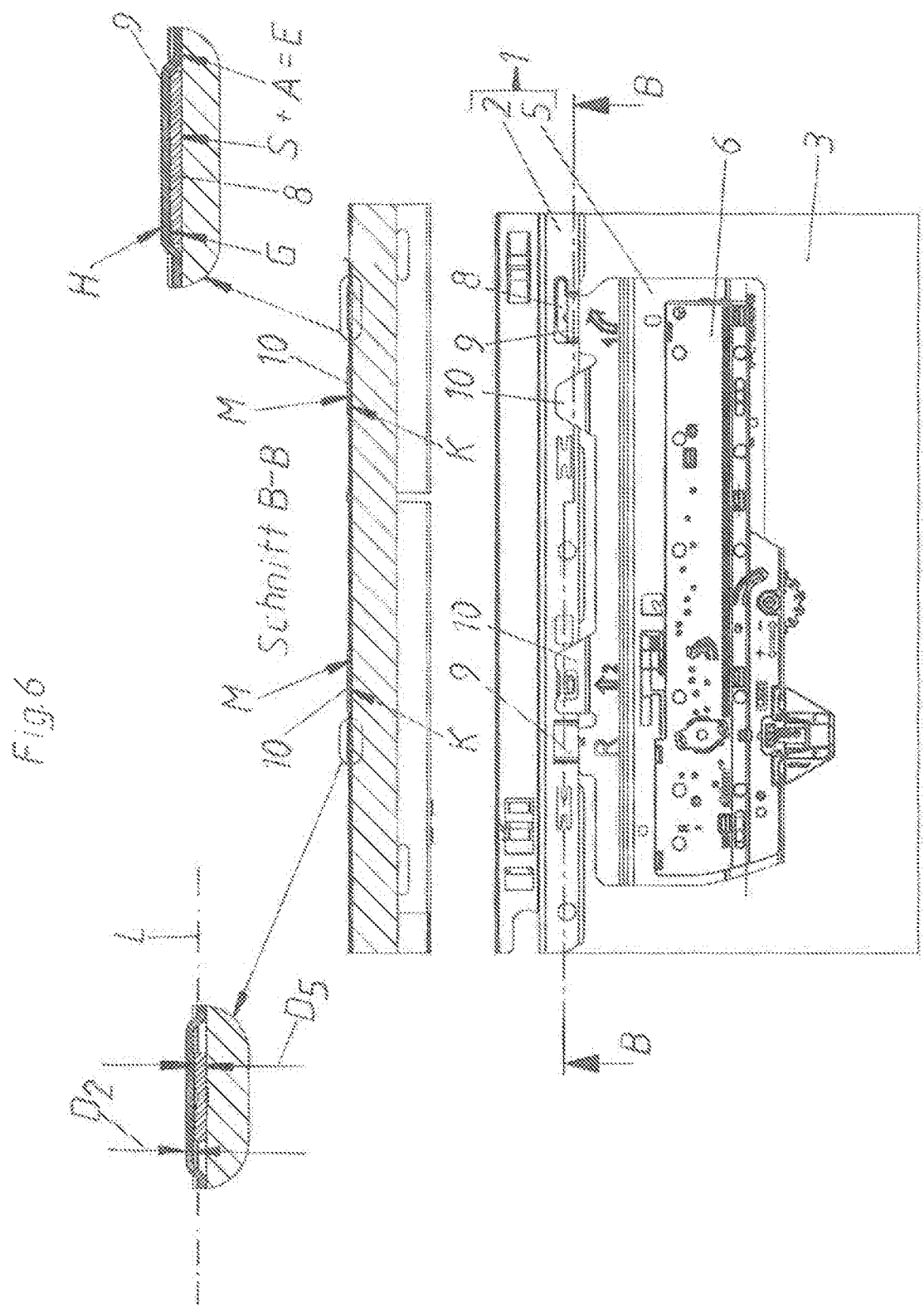
FIG. 6 is a view from below and a section through a drawer according to the present invention.

In contrast to the conventional arrangement shown in FIG. 5, an exemplary embodiment of the present invention is illustrated in FIG. 6. In the bottom region, again, a view from below in the direction of the drawer base 3 is illustrated. The section B-B illustrated above runs parallel to a lateral surface of the drawer side wall 12. It is apparent from section B-B that the drawer base 3 rests in a flush manner against the bearing web 2. The holding device 5 for holding the drive device 6 is inserted into both receiving areas 9 of the bearing web 2 by both securing elements 8. The clamping elements 10 provide for an even better hold. In each of the zoomed details top left and top right, the bearing region A of the bearing web 2 is apparent, and the drawer base 3 rests on this bearing region A. The receiving area 9 comprises a recess which leads away from or is separate from (spaced apart from) the bearing region A. The securing element 8 is inserted into (resides within) this recess of the receiving area 9. The support surface S of the securing element 8 facing towards the drawer base 3 together with the bearing region A of the bearing web 2 form the substantially flat (co-planar) drawer base bearing surface E. In addition, the securing element 8 comprises a holding surface H which is remote from (opposite) the support surface S. In the secured state BZ, this holding surface H rests against the counter holding surface G of the receiving area 9. This counter holding surface G and the holding surface H are oriented parallel to the bearing region A. The bearing web 2 is formed as a metal sheet, wherein the receiving area 9 is bent out of this metal sheet as a recess. The bearing web 2 has a sheet thickness $D_2$ of about 0.8 mm. The holding device 5 and its securing element 8 are also formed as a metal sheet. This holding device 5 has the sheet thickness $D_5$. This sheet thickness $D_5$ is approximately as thick as the sheet thickness $D_2$ of the bearing web 2. As particularly well apparent from both details, the counter holding surface G of the receiving area 9—measured rectangular to the longitudinal extension L of the metal sheet—is distanced by (i.e., spaced apart by) the sheet thickness $D_2$ from the bearing region A. In addition, it is clearly apparent that in the secured stated BZ, the securing element 8 and the receiving area 9 together—measured perpendicular to the longitudinal extension L of the metal sheet—have a thickness which is twice as large as the sheet thickness $D_2$ of the bearing web 2. Only in the section B-B it is apparent that each of the clamping elements 10 has a clamping surface K facing towards the drawer base 3. These clamping surfaces K rest against a counter clamping surface M of the bearing web 2, which counter clamping surface M is remote (faces away) from the drawer base 3.

Figure 7:
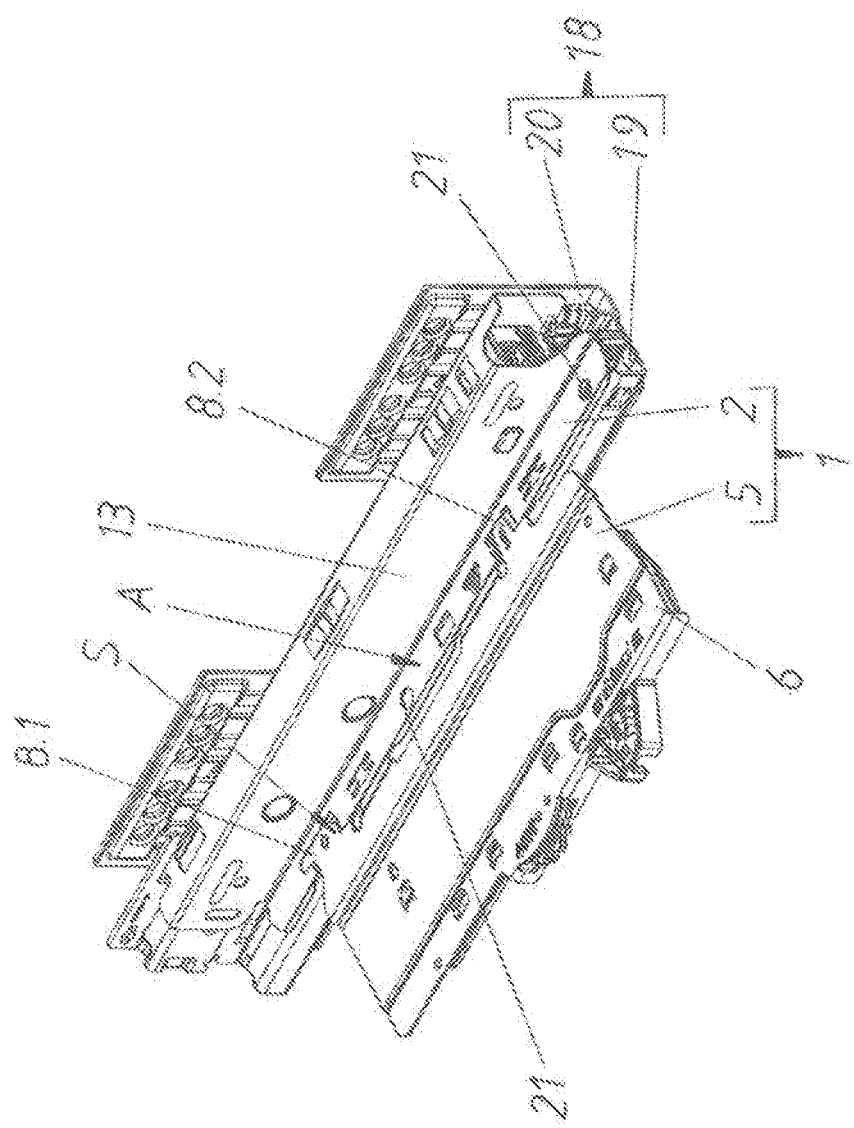
FIG. 7 is a perspective view showing an arrangement comprising a holding device and a bearing web with an extension guide.

FIG. 7 shows an arrangement 1 together with an extension guide 18 in a perspective illustration. The arrangement 1 comprises the holding device 5 for the drive 6 and the bearing web 2 for the drawer base 3. The bearing web 2—in this case—is part of a profile-shaped carrier device 13 for a drawer side wall 12 (not illustrated). This carrier device 13 can also be denoted as container rail and forms a lateral frame part of the drawer 4. The extension guide 18 comprises a drawer rail 19 and a carcass rail 20. Also a central rail can be provided when the extension guide 18 is formed as a full extension slide. The carrier device 13 is detachably connected to the drawer rail 19. In the illustration according to FIG. 7, the securing elements 8 (concretely in form of a first securing element 8.1 and a second securing element 8.2) and its supporting surfaces S are well apparent. In addition, the bearing region A of the bearing web 2 for the drawer base 3 (not illustrated) is apparent. The drawer base 3 can be fixedly connected by not illustrated securing members (e.g. screws) to the bearing web 2 by way of the recesses 21 formed in the bearing web 2. In this view, the clamping elements 10 are situated below the bearing web 2. By way of the clamping elements 10, the holding device 5 can also be secured to the bearing web 2 without the drawer base 3 as the, preferably tongue-shaped, clamping elements 10 and the securing elements 8 quasi tongs-like clamp the bearing web 2. If no clamping elements 10 are provided, the mounting of the drawer base 3 is necessary for a secure mounting.

The securing movement of the holding device 5 is illustrated in FIGS. 8 to 10.

According to FIG. 8, the (left-sided) first securing element 8.1 is initially inserted with the nose-shaped protrusion 22 into the (left-sided) first receiving area 9.1. As a consequence, the holding surface H of the first securing element 8.1 remote from the drawer base 3 reaches contact with the counter holding surface G of the first receiving area 9.1 facing towards the drawer base 3.

In FIG. 9, the holding device 5 has swivelled further so that also the clamping surface K of the (left-sided) first clamping device 10.1 reaches contact with the counter clamping surface M of the bearing web 2. In the details illustrated on the right side, it is apparent that the (right-sided) second clamping element 10.2 comprises a recess 23. An elevation 24 leading away from the bearing region A is correspondingly formed on the bearing web 2. Both clamping elements 10.1 and 10.2 are each connected by way of a bent region 11 with the drawer base resting region 5b of the holding device 5.

In FIG. 10 the holding device 5 is completely clamped to the bearing web 2. The secured state BZ is reached. This means, the holding surface H of the first securing element 8.1 rests against the counter holding surface G of the first receiving area 9.1 and the holding surface H of the second securing element 8.1 rests against the counter holding surface G of the second receiving area 9.2. In the right detail of FIG. 10 it is apparent that the elevation 24 in the bearing web 2 is intruding into the recess 23 (not visible here) in the second clamping element 10.2. Thereby, a particularly secure hold is reached.

In FIG. 11 the arrangement 1 is perspectively illustrated from below. The same arrangement 1 is illustrated in FIG. 12 in a plan view from below. In these illustrations, the drawer base 3 is also connected to the bearing web 2, wherefore the mounting state MZ is given. The holding device 5 comprises a substantially flat drive device mounting region 5a and a substantially flat drawer base resting region 5b as well as the two securing elements 8.1 and 8.2. The drive device 6 is, preferably detachably, mounted to the drive device mounting region 5a. It is well apparent in FIG. 11 that both receiving areas 9.1 and 9.2 are lug-shaped. In FIG. 11 it is also apparent that the elevation 24 is protruding through the recess 23 of the second clamping element 10.2. Both clamping elements 10.1 and 10.2 each rest via the clamping surfaces K against the counter clamping surfaces M of the bearing web 2 (hidden by the clamping elements 10.1. and 10.2). The securing of the holding device 5 can be carried out before the mounting of the drawer base 3 (see FIGS. 7 to 10). Preferably, however, the securing of the holding device 5 is carried out only when the drawer base 3 is mounted to the bearing web 2.

Finally, FIG. 13 shows in a front view the holding device 5 together with the drive device 6 and the drawer base 3. It is well apparent that a bend 5c is formed between the drive device mounting region 5a and the drawer base resting region 5b. This bend 5c is formed in such a way that the drive device mounting region 5a is bent in the direction of the drawer base 3 relative to the drawer base resting region 5b in an angle region a between 1° and 15°, preferably between 3° and 5°. In concrete, there is an angle of 4° approximately. As a consequence, the drive device 6 is pressed onto the drawer base 3. This leads to a vibration-free hold and to little space requirement.

LIST OF REFERENCE SIGNS

1 arrangement
2 bearing web
3 drawer base
4 drawer
5 holding device
5a drive device mounting region 5b drawer base resting region
5c bend
6 drive device
7 furniture carcass
8 securing element
8.1 first securing element
8.2 second securing element
9 receiving area
9.1 first receiving area
9.2 second receiving area
10 clamping element
10.1 first clamping element
10.2 second clamping element
11 bent region
12 drawer side wall
13 carrier device
14 item of furniture
15 front panel
16 drawer back wall
17 synchronizing rod
18 extension guide
19 drawer rail
20 carcass rail
21 recesses
22 nose-shaped protrusion
23 recess
24 elevation
A bearing region
S support surface
BZ secured state
E flat drawer base bearing surface
H holding surface
G counter holding surface
$D_2$ sheet thickness of the bearing web
L longitudinal extension
$D_5$ sheet thickness of the holding device
α angle region
K clamping surface
M counter clamping surface
MZ mounting state
OS open position
SS closed position

The invention claimed is:

1. An arrangement comprising:
   a bearing web for supporting a drawer base of a drawer; and
   a drive device for driving the drawer relative to a furniture carcass; and
   a holding device for holding the drive device,
   wherein the holding device has a securing element for securing the holding device to the bearing web,
   wherein the bearing web comprises a receiving area for receiving the securing element and a bearing region for bearing against and supporting the drawer base at a location adjacent to the receiving area,
   wherein the securing element comprises a support surface arranged to face the drawer base in a secured state, the secured state being a state in which the holding device is secured to the bearing web,
   wherein the support surface of the securing element and the bearing region of the bearing web collectively form a substantially flat drawer base bearing surface for supporting the drawer base in the secured state, the drawer base bearing surface being configured to be brought to rest flush against the drawer base in the secured state, and
   wherein the securing element has a holding surface facing in an opposite direction from the support surface and configured such that, in the secured state, the holding surface rests against a counter holding surface of the receiving area of the bearing web.

2. The arrangement according to claim 1, wherein the holding surface is oriented parallel to the support surface, and the counter holding surface is oriented parallel to the bearing region.

3. The arrangement according to claim 2, wherein the bearing web is a metal sheet with a substantially constant sheet thickness.

4. The arrangement according to claim 3, wherein the receiving area comprises a recess in the metal sheet, the recess configured to lead away from the bearing region.

5. The arrangement according to claim 4, wherein a plane of the counter holding surface of the receiving area is spaced apart from a plane of the bearing region by a distance equal to a thickness of the metal sheet.

6. The arrangement according to claim 5, wherein, in the secured state, the securing element and the receiving area together have a thickness twice as thick as the sheet thickness of the bearing web, the thickness being measured in a direction perpendicular to a longitudinal axis of the bearing web.

7. The arrangement according to claim 1, wherein the holding device is a metal sheet with a substantially constant sheet thickness.

8. The arrangement according to claim 1, wherein the holding device comprises a substantially flat drive device mounting region, a substantially flat drawer base resting region, and the securing element.

9. The arrangement according to claim 8, wherein a bend is formed between the drive device mounting region and the drawer base resting region, the drive device mounting region being bent relative to the drawer base resting region in an angle region between 1° and 15°.

10. The arrangement according to claim 9, wherein the drive device mounting region is bent relative to the drawer base resting region in an angle region between 3° and 5°.

11. The arrangement according to claim 1, wherein a clamping element having a clamping surface is arranged on the holding device, the clamping element being configured to abut a counter clamping surface of the bearing web in the secured state abuts with the clamping surface facing towards the drawer base, the counter clamping surface facing in an opposite direction than the bearing region of the bearing web.

12. The arrangement according to claim 11, wherein the clamping element is connected to the drawer base resting region by a bent region.

13. The arrangement according to claim 11, wherein the clamping surface of the clamping element is spaced apart from the support surface of the securing element by a distance equal to a thickness of a metal sheet forming the holding device, the thickness being measured perpendicular to a longitudinal axis of the bearing web.

14. The arrangement according to claim 11, wherein the clamping surface is oriented parallel to the support surface of the securing element, and the counter clamping surface is oriented parallel to the bearing region of the bearing web.

15. The arrangement according to claim 1, further comprising a drawer side wall, the bearing web being part of at least one group including:
   the drawer side wall,
   a carrier device to be connected to a drawer side wall, and
   a drawer rail of an extension guide.

16. The arrangement according to claim 1, comprising a drive device for driving the drawer relative to the furniture carcass, wherein the drive device is mounted to the holding device.

17. The arrangement according to claim 1, further comprising a drawer base butting in a flush manner the bearing region of the bearing web and the support surface of the securing element when the drawer is mounted to the bearing web and the holding device.

18. The arrangement according to claim 17, wherein the drawer base is substantially flat.

19. An item of furniture comprising a furniture carcass and a drawer, wherein the drawer comprises the arrangement according to claim 1.

20. The arrangement according to claim 1, wherein the drive device is an ejection device.

* * * * *